United States Patent Office 3,056,441
Patented Oct. 2, 1962

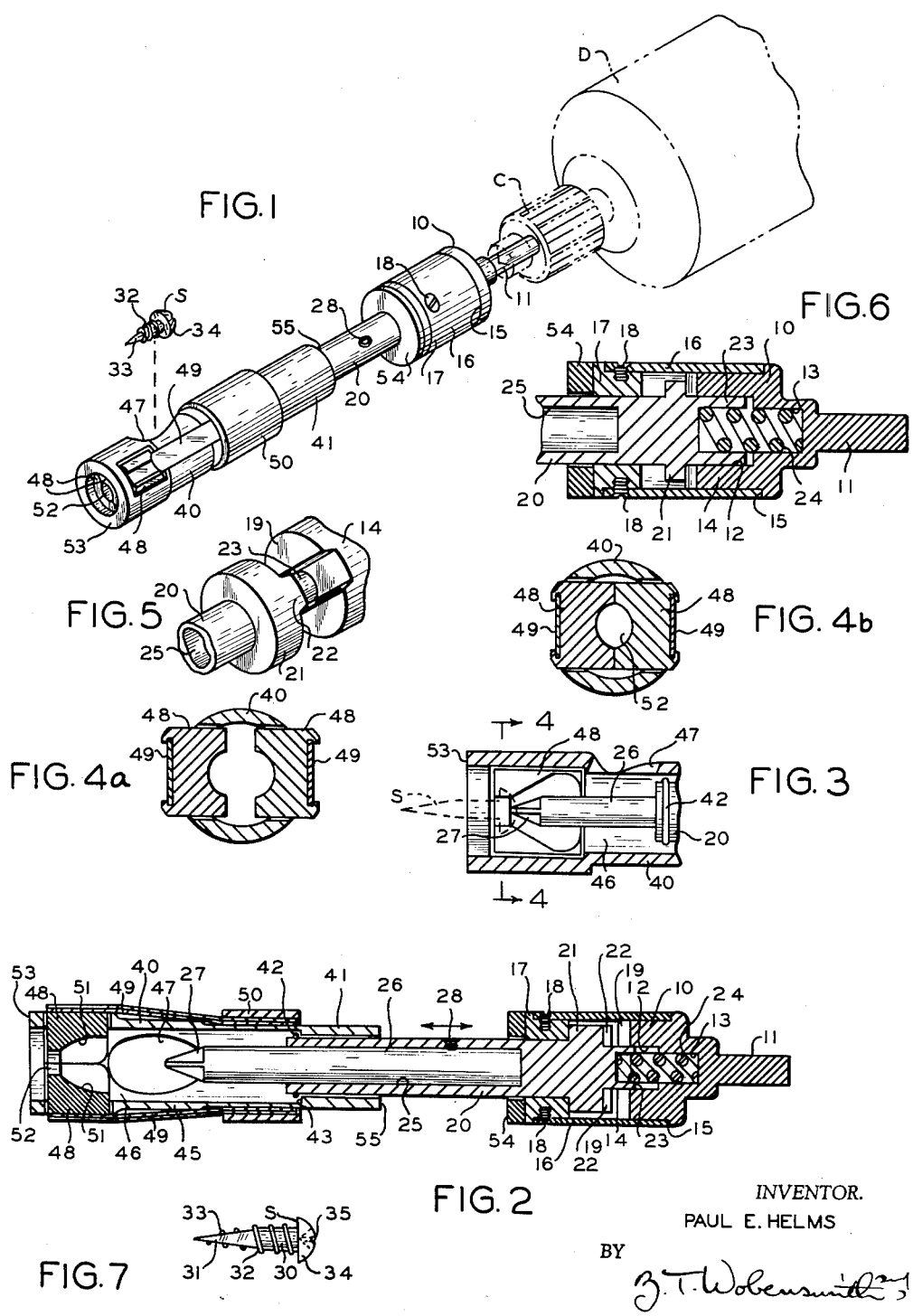

3,056,441
SCREW HOLDER AND DRIVER
Paul E. Helms, Blue Hill, Media, Pa.
Filed May 7, 1959, Ser. No. 811,604
4 Claims. (Cl. 145—52)

This invention relates to screw holders and drivers.

Various holders for screws and the like for aiding in driving have heretofore been proposed. Many of these were provided with a clutch which was released upon the attainment of a predetermined torque for preventing continued driving. Devices of this character had various defects, particularly because of the tendency to deface the screw or the tendency to slip out of engagement with the screw to be driven. The failure of the clutch to release also resulted in injury to the work or to the threads of the screw.

It is the principal object of the present invention to provide a screw holder in which the screw is centered and held for delivery, and in which the drive is disconnected when the screw has been driven to a desired extent.

It is a further object of the present invention to provide a screw holder and driver which is capable of use with a magazine feed but which is not limited to such construction.

It is a further object of the present invention to provide an improved screw holder and driver which can be motor driven with conventional portable electric motor equipment and which will release and discontinue driving when the screw has been inserted to the desired extent, but in which the driving bit remains in position in engagement with the screw slot until the same is withdrawn or released by the user.

It is a further object of the present invention to provide an improved screw holder and driver in which engagement of a part of the device with the work is utilized to discontinue the driving of the screw being inserted.

It is a further object of the present invention to provide a screw holder and driver which is simple and compact in construction, in which the parts can be readily constructed of available equipment, and which will be free from likelihood of breakdown or failure in use.

Other objects and advantageous features of the invention will be apparent from the description and claims.

The nature and characteristic features of the invention will be more readily understood from the following description, taken in connection with the accompanying drawings forming part thereof, in which:

FIGURE 1 is a perspective view of a screw holder and driver in accordance with the present invention;

FIG. 2 is a longitudinal central sectional view of the screw holder and driver in accordance with the invention in the position for insertion of a screw therein and with the clutch in disengaged position;

FIG. 3 is a fragmentary sectional view, enlarged, of one end portion of the screw holder and driver in accordance with the invention showing the advancing of a screw therein;

FIG. 4A is a fragmentary sectional view taken approximately on the line 4—4 of FIG. 3 and showing the gripping jaws in separated condition;

FIG. 4B is a view similar to FIG. 4A showing the screw gripping jaws in closed position;

FIG. 5 is a fragmentary perspective view of an internal clutch employed in connection with the invention in separated condition;

FIG. 6 is a fragmentary longitudinal sectional view showing the internal construction with the clutch in engaged condition; and FIG. 7 is a side elevational view of a screw to be driven.

It should, of course, be understood that the description and drawings herein are illustrative merely, and that various modifications and changes may be made in the structure disclosed without departing from the spirit of the invention.

Referring now more particularly to the drawings, in which a preferred embodiment of the invention is illustrated, a rear body section 10 is provided having a shank 11 for the reception in the chuck C of a portable motor operated drill D or the like.

The body section 10 has a central longitudinal axial bore 12 therein with a reduced portion 13. The body section 10, in surrounding relation to the bore 12, has an annular portion 14 with an exterior shoulder 15 formed thereon. An external cylindrical housing section 16 is provided, abutting against the shoulder 15 and extending forwardly a predetermined longitudinal distance. An end plug 17 extends into the housing section 16 and is secured in position in any desired manner, such as by a plurality of screws 18 extending through the housing and in engagement therewith and extends from the housing section 16 a predetermined longitudinal distance.

The annular portion 14 of the body section 10 interiorly of the housing section 16, and at the front end thereof has a plurality of clutch teeth 19 formed thereon.

A spindle 20 is provided extending through the end plug 17 with an enlarged head 21 interiorly disposed with respect to the housing section 16 and held against separation by the engagement of the head 21 with the plug 17. The end of the head 21 facing the end of the annular portion 14 is provided with a plurality of clutch teeth 22 complemental to the teeth 19 on the annular portion 14 and engageable therewith as hereinafter explained.

The spindle 20 also has a hollow extension 23 extending into the bore 12 and a compression spring 24 is interposed within the hollow extension 23 and the bore portion 13 for normally urging the spindle 20 longitudinally in a direction to separate the clutch teeth 19 and 22.

The spindle 20 preferably has a bore 25 for the reception of the driver 26. The driver 26 has an end bit 27, of any desired shape, in accordance with the slots or grooves in the head of the screw S to be driven, and can be removably held in the bore 25 by a screw 28.

For purposes of explanation, the screw S shown is of the self-tapping type with a cylindrical shank 30 having a tapered end 31, the shank 30 having threads 32 rolled thereon and opposite flat or curved side faces 33 at an angle of the order of 10° from the longitudinal axis of the shank 30 for cutting or drilling a hole in the material in which the screw S is to be lodged upon rotation of the screw S.

The head 34 of the screw S can be of any desired type and for purposes of illustration the head 34 is shown as round with a slot or recess 35 of the type known as a "Phillips" drive. The present invention is not however limited to use with the specific screw S illustrated.

The spindle 20 has a front body section or screw holder 40 slidably mounted thereon. The screw holder 40 has a rear end section 41 for slidably and rotatably supporting the holder 40 on the spindle 20, separation being limited by a snap ring 42 on the spindle 20 abutting against a shoulder 43 at the front of the rear end section 41.

The holder 40 has a longitudinally extending body portion 45 with a chamber 46 therein for the reception of a screw S to be driven. An access opening 47 communicating with the chamber 46 permits of the insertion or delivery thereinto of a screw S.

The holder 40 is provided with a pair of oppositely disposed gripping jaws 48 mounted on springs 49 which extend rearwardly along the exterior of the holder 40 and are held in engagement therewith by a retainer collar 50.

The jaws 48 have curved guiding surfaces 51 for guiding the pointed end of a screw S into a central opening 52 and are initially resiliently separable as required to permit the passage of at least part of the shank 30 therebetween, and resiliently separable to permit the head 34 to pass therebetween upon the advance of the screw S.

The holder 40 has a front end face 53 which serves as a control face, as hereinafter explained, and a collar 54 of predetermined thickness is provided for engagement by the rear end face 55 of the rear end section 41 and with the front end of the plug 17 to limit the extent of movement of the holder body 40 with respect to the spindle 20. The end to end dimension of the front body section or holder 40 from the face 53 to the rear end face 55 is utilized with the thickness of the collar 54 and the longitudinal dimension of the end plug 17 and body portion 16 for clutch control.

The mode of operation will now be pointed out.

A screw S is inserted through the side opening 47 into the chamber 46 in the body of the holder 40 and is forced by the driver bit 27 into engagement between the jaws 48 as longitudinal axial pressure is applied thereon. As additional longitudinal axial pressure is applied on the body section 10, in the direction of the intended advance of the screw S to be driven, a compression of the spring 24 is effected so that the clutch teeth 19 and 22 are brought into meshing engagement for rotating the spindle 20 upon rotation of the body section 10.

Pressure is also applied at the same time through the spindle 20 and the driver 26 in an advancing longitudinal axial direction and against the screw S, and upon rotation of the shank 11 turns the same for application of the screw S into wood, metal, plastic or other desired materials. This pressure retains the spring 24 in compressed condition so that the teeth 19 and 22 are maintained in meshed relation.

As the body section 10 is rotated, the spindle 20 is also rotated with its bit 26 in engagement with the groove or slot 35 of the screw S so that the screw S is driven into the material.

As the screw S is driven into the material it is urged forwardly by the bit 26, the spring jaws 48 spreading to permit the head of the screw S to move therebeyond. As the screw S advances further into the material, the end face 53 of the holder 40 comes into engagement with the surface of the material into which the screw S is being driven in predetermined relation to the engagement with the material of the inner end face of the head 34 of the screw S. When the surface 53 comes into contact with the work it initiates the relief of the pressure on the screw S which is effective back through the body 40, the rear end section 41, through the face 55 and the collar 54 and the end plug 17 to the driving unit 10. No further advancing movement is available except for the driver 26 and the spindle 20 movable therewith. The screw S with the driver 26 and spindle 20 continue their forward movement until the head 21 disengages its teeth 22 from the teeth 19 aided by the spring 24 and the lead of the screw S in the work. The separation of the clutch discontinues the driving of the spindle 20 so that further driving of the screw S is discontinued and overdriving of the screw S is avoided. The extent of movement of the screw S, before release of the clutch will be determined by the linear distance rearwardly from the face 53 to the outer face of the plug 17, including the thickness of the collar 54. This dimension may be varied for different screws by the use of other collars 54 of different thicknesses.

It will thus be seen that the application of force for driving the screw S can be applied for drilling, tapping, and threading the screw S into position and releasing the same from the jaws 48 and the holder in a single continuous operation, and without injury to the screw S being driven or to the material into which the screw S is driven.

I claim:

1. Screw driving mechanism comprising a rearwardly disposed rotatable body section having a forward portion with a hollow interior space and a rear driving portion for effecting rotation of said rotatable body section, a spindle rotatably and longitudinally axially movable with respect to said body section and having a rear head portion disposed within said interior space, interengageable portions within said space on said body section and on said rear head portion for rotating said body section and said spindle in unison, spring means in said body section normally urging said interengageable portions apart, a screw bit carried by said spindle and rotatable therewith, a second body section longitudinally axially slidably mounted on said spindle at the forward end thereof and having portions carried thereby for retaining a screw for engagement by said bit, said second body section having a front end face for engagement with the surface of the material into which the screw is to be driven and an opposite end portion of such length to engage said rotatable body section and separate said interengageable portions and thereby discontinue driving of said spindle upon engagement of said front end face with the surface of the material.

2. Screw driving mechanism as defined in claim 1 in which said spindle has a rearward extension and said rotatable body section has a bore, said rearward extension extending into said bore in said rotatable body section, and said spring means is mounted in said bore and in engagement in the interior of said extension.

3. Screw driving mechanism as defined in claim 1 in which said spindle has a collar of predetermined thickness thereon interposed between the rear end of said second body section and the front end of said rotatable body section for controlling the release of said interengageable portions.

4. Screw driving mechanism comprising a rearwardly disposed rotatable body section having a rearwardly extending driving portion for effecting rotation of said body section, said body section having a forwardly disposed exterior housing section with an interior space and a bore extending rearwardly of said space, a spindle rotatably and longitudinally axially movable with respect to said housing section and having a rear head movable in said interior space and a rear extension from said head movable in said bore, interengageable portions within said space on a rear part of said spindle head and a forwardly facing interior part of said body section for rotating said spindle and said body section in unison, spring means in said bore normally urging said interengageable portions apart, said spindle having a forwardly extending hollow portion, a screw bit secured in said hollow portion and rotatable with said spindle, a second body section longitudinally axially slidably mounted on said spindle at the forward end thereof, said second body section having an interior space for the reception of a screw for engagement by said bit, said second body section having a front end face for engagement with the surface of the material into which the screw is to be driven and a rear end portion of such length to engage said rotatable body section and separate said interengageable portions and thereby discontinue driving of said spindle upon engagement of said front end face with the surface of the material.

References Cited in the file of this patent

UNITED STATES PATENTS

| | | |
|---|---|---|
| 2,235,374 | Kellogg | Mar. 18, 1941 |
| 2,255,827 | Snyder | Sept. 16, 1941 |
| 2,790,471 | Graybill | Apr. 30, 1957 |